T. B. McCONAUGHEY.
Hand-Seeder.
No. 60,218.  Patented Dec 4 1866.
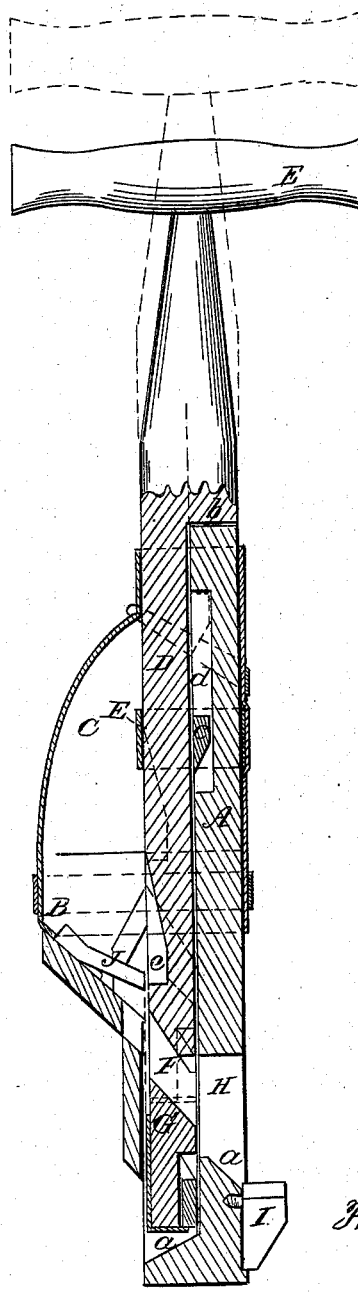

United States Patent Office.

IMPROVEMENT IN CORN PLANTERS.

THOMAS B. McCONAUGHEY, OF NEWARK, DELAWARE.

Letters Patent No. 60,218, dated December 4, 1866.

SPECIFICATION.

TO ALL WHOM IT MAY CONCERN:

Be it known that I, THOMAS B. McCONAUGHEY, of Newark, in the county of New Castle, and State of Delaware, have invented a new and improved Hand Corn Planter; and I do hereby declare that the following is a full, clear, and exact description thereof, which will enable any one skilled in the art to make and use the same, reference being had to the accompanying drawing, making a part of this specification, said drawing being a side sectional view of my invention.

This invention relates to an improvement on a hand corn planter for which Letters Patent were granted to me bearing date March 27th, 1860. The invention and improvement consist in dispensing with a spring used in the original device by so arranging the parts that the gravity of one piece to which the seed-box is attached, and the other piece to which the handle is attached, and which is operated directly by the attendant, will be sufficient to cause the seed to be distributed or dropped without the aid of a spring. The invention further consists in a means employed for insuring the uniform distribution of the seed at each discharge, that is to say, the insuring of the discharge, A, an equal amount of seed at each dropping.

A represents one part of the device, which has a seed-box, B, attached to it, a bag, C, being secured to the seed-box to augment its capacity; D is a slide, which works in a groove made longitudinally in A, or between cleats, a, secured one at each side of A, the slide, D, passing through the seed-box and having a handle, E, at its upper end. The extent of the downward movement of the slide, D, is determined by a shoulder, b, which strikes the upper end of the part, A, and the extent of the upward movement of the slide is determined by a stop, c, attached to D, and which is fitted in an oblong slot, d, in A, as shown clearly in the drawing. The two parts, A D, are kept snugly in contact by a metallic band, E, which is secured to the part A, the part D being allowed to slide freely in the band. In the part D, and in line with the lower part of the seed-box, there is made an oblique opening, F, which has a gauge, G, fitted in it; by adjusting this gauge the capacity of the opening, F, may be increased or diminished as desired. Just above the opening, F, there is made in the part D a recess, e, the use of which will be presently shown. In the lower part of A, there is made an opening, H, the bottom, f, of which is inclined, and to the part A, and in line with the bottom of the opening, H, there is attached a small block, I, having its upper edge bevelled at two opposite sides to form a seed-scatterer. On the bottom of the seed-box, B, there is secured a valve, J, the end of which bears against the side of the part, D; this valve may be constructed of India rubber or other suitable material.

The operation is as follows: The box, B, is filled with seed, and the top of the bag, C, closed by a string; each time the slide D is drawn upward, the opening, F, will become filled with seed, the recess, e, serving to agitate or stir up the seed so as to insure the filling of F, while the valve, J, serves to prevent the escape of seed at the bottom of the box, B, and obviate the friction which would ensue were the bottom of the box, B, made to fit snugly against D. When the slide or part, D, is forced down the filled opening, F, comes in line with the opening H, and the seed escapes from F through H into the hill or drill, the upper bevelled end of I scattering the seed into the hill or drill. Thus, by this simple arrangement, all springs are avoided, the gravity of A, in connection with that of the seed-box attached to it, being sufficient to admit of D being operated with facility by hand.

Having thus described my invention, what I claim as new, and desire to secure by Letters Patent, is—

The slide or part D of the corn planter provided with an oblique opening, F, with a recess, e, above it for the purpose of stirring or agitating the seed and insuring the filling of F, as set forth, when this is combined with the attachment of the said slide to the part A by means of the band F, and the motions of said slide are limited by the stops b and c, as described.

THOMAS B. McCONAUGHEY.

Witnesses:
J. B. McCONAUGHEY,
WILLIAM McCONAUGHEY.